US010337941B2

(12) United States Patent
Buck et al.

(10) Patent No.: US 10,337,941 B2
(45) Date of Patent: Jul. 2, 2019

(54) PRESSURE SENSOR

(71) Applicant: KISTLER HOLDING AG, Winterthur (CH)

(72) Inventors: Reinhold Buck, Illnau (CH); Martin Giger, Winterthur (CH); Philip Graf, Weinfelden (CH)

(73) Assignee: Kistler Holding AG, Winterthur (CH)

( * ) Notice: Subject to any disclaimer, the term of this patent is extended or adjusted under 35 U.S.C. 154(b) by 180 days.

(21) Appl. No.: 15/221,812

(22) Filed: Jul. 28, 2016

(65) Prior Publication Data
US 2017/0030786 A1 Feb. 2, 2017

(30) Foreign Application Priority Data

Jul. 31, 2015 (EP) ..................... 15179379
Jan. 15, 2016 (EP) ..................... 16151550

(51) Int. Cl.
| G01L 23/10 | (2006.01) |
| B23K 1/00 | (2006.01) |
| B23K 20/02 | (2006.01) |
| G01L 9/00 | (2006.01) |
| G01L 19/04 | (2006.01) |
| G01M 15/08 | (2006.01) |
| G01L 19/00 | (2006.01) |
| G01L 19/14 | (2006.01) |

(52) U.S. Cl.
CPC ............ G01L 23/10 (2013.01); B23K 1/0016 (2013.01); B23K 20/02 (2013.01); B23K 20/023 (2013.01); G01L 9/008 (2013.01); G01L 19/0069 (2013.01); G01L 19/04 (2013.01); G01L 19/148 (2013.01); G01M 15/08 (2013.01)

(58) Field of Classification Search
CPC ....................................................... G01L 23/10
USPC ............................................................ 73/723
See application file for complete search history.

(56) References Cited

U.S. PATENT DOCUMENTS

| 3,364,368 A | 1/1964 | Sonderegger | |
| 4,220,390 A * | 9/1980 | Cobaugh ............ | H01R 4/2462 439/401 |
| 4,645,965 A | 2/1987 | Paganelli | |
| 4,675,643 A | 6/1987 | Tanner et al. | |
| 4,701,726 A * | 10/1987 | Holdsworth ........ | H05K 9/0066 333/12 |

(Continued)

FOREIGN PATENT DOCUMENTS

| DE | 3423711 A1 | 1/1985 |
| DE | 199 36 300 A1 | 2/2000 |

(Continued)

OTHER PUBLICATIONS

EP Search Report (15179379.1), dated Jan. 5, 2016.
EP Search Report (EP 16151550) dated Jul. 15, 2016.
EP Search Report (EP 16178288.3) dated Nov. 9, 2016.

*Primary Examiner* — Justin Seo
*Assistant Examiner* — Jean F Morello
(74) *Attorney, Agent, or Firm* — Dority & Manning, P.A.

(57) ABSTRACT

A pressure sensor includes a sensor assembly and an evaluation unit. The sensor assembly includes a sensor and an electrode arrangement. The sensor generates signals under the action of a pressure profile, and the electrode arrangement transmits the signals to the evaluation unit. The evaluation unit includes an electric circuit board that is connected to the electrode arrangement by material bonding.

20 Claims, 9 Drawing Sheets

(56) References Cited

U.S. PATENT DOCUMENTS

| | | | | |
|---|---|---|---|---|
| 4,776,804 A | * | 10/1988 | Johnson | H05K 1/14 439/62 |
| 4,950,181 A | * | 8/1990 | Porter | H01L 23/445 257/E23.096 |
| 6,002,437 A | * | 12/1999 | Morioka | H04N 5/2252 348/373 |
| 6,389,903 B1 | | 5/2002 | Oba et al. | |
| 7,000,478 B1 | | 2/2006 | Zwollo et al. | |
| 2003/0095404 A1 | * | 5/2003 | Becks | F21L 14/023 362/185 |
| 2005/0034525 A1 | | 2/2005 | Moelkner et al. | |
| 2006/0156825 A1 | | 7/2006 | Toyoda et al. | |
| 2009/0026889 A1 | * | 1/2009 | Wolfer | G01L 23/10 310/338 |
| 2009/0320576 A1 | * | 12/2009 | Borgers | G01L 23/18 73/114.18 |
| 2015/0040676 A1 | * | 2/2015 | Schlitzkus | G01L 19/148 73/756 |
| 2016/0117584 A1 | * | 4/2016 | Yoneda | G06K 19/0716 235/492 |

FOREIGN PATENT DOCUMENTS

| | | |
|---|---|---|
| DE | 103 33 438 A1 | 2/2005 |
| GB | 2 022 261 A | 12/1979 |
| WO | WO 2011/047919 A1 | 4/2011 |
| WO | WO 2013/147260 A1 | 10/2013 |

\* cited by examiner

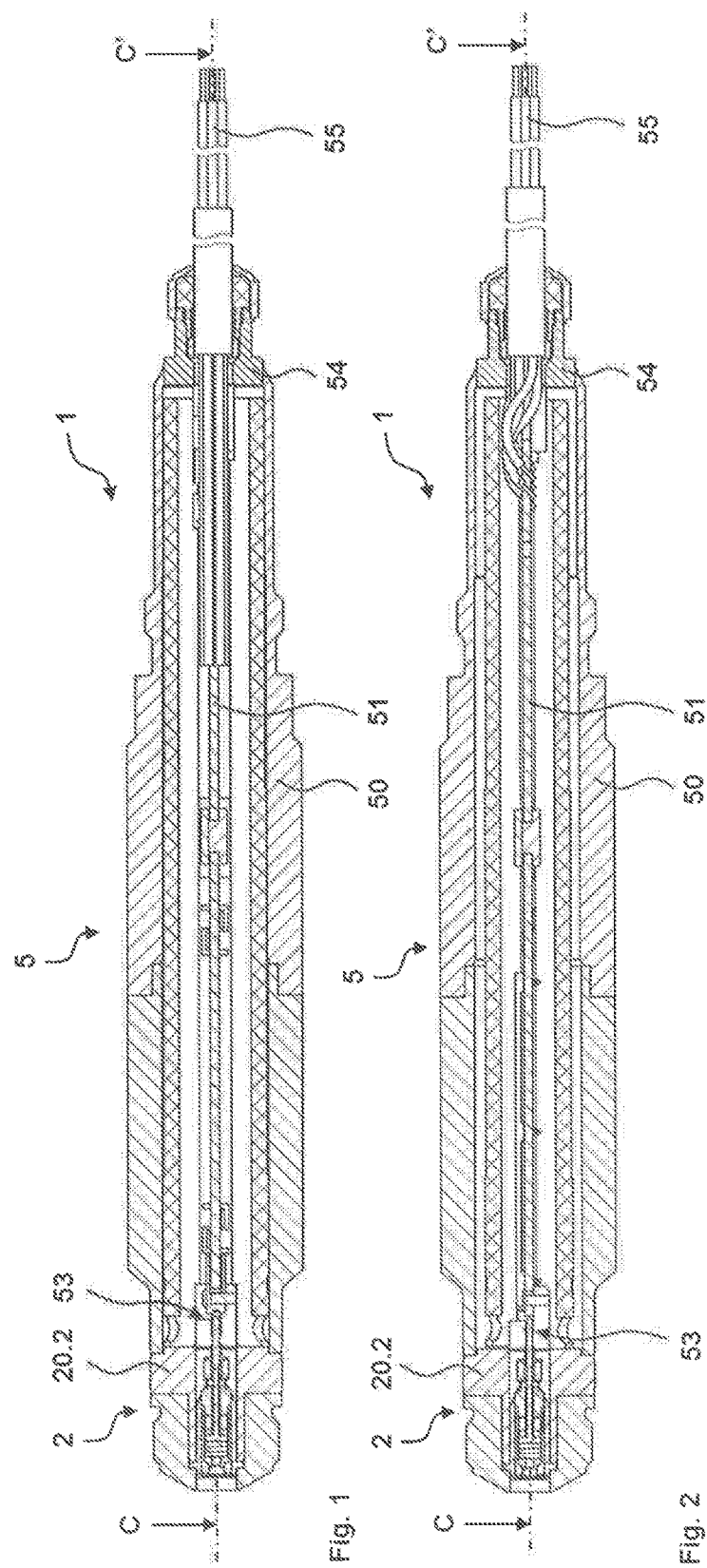

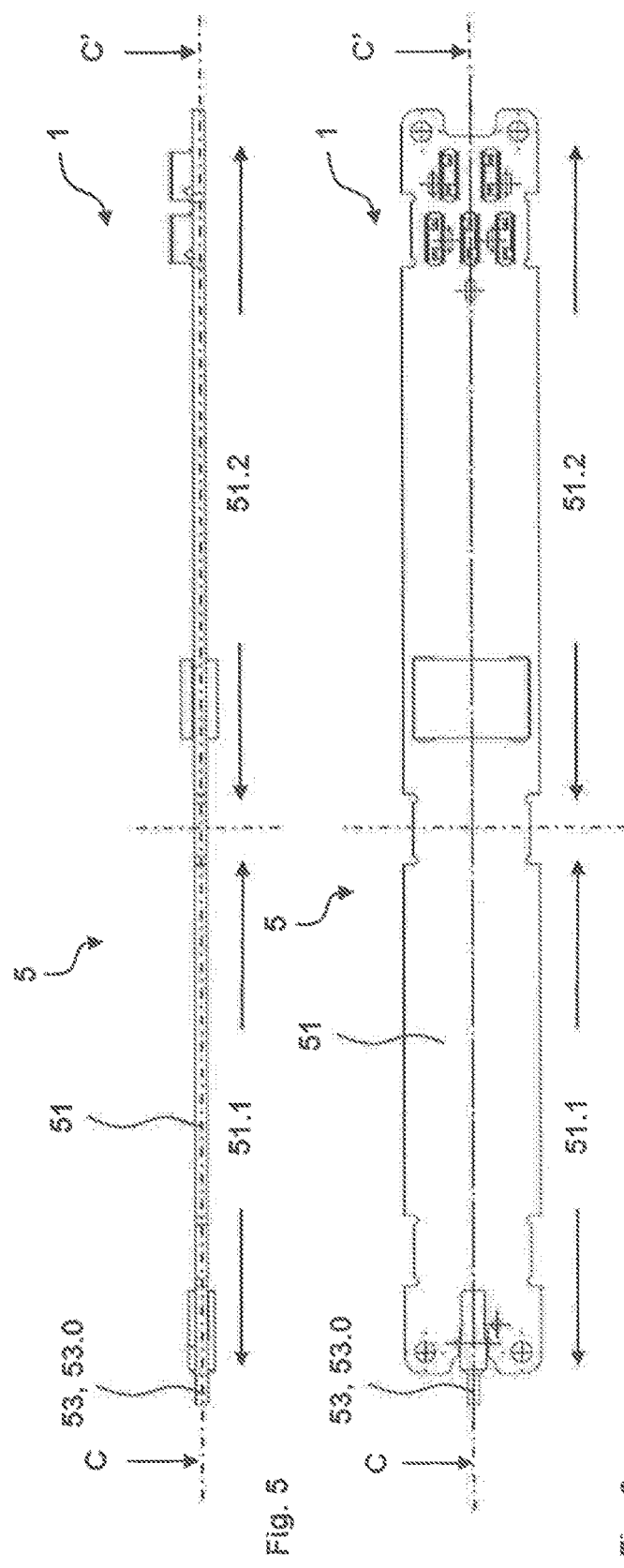

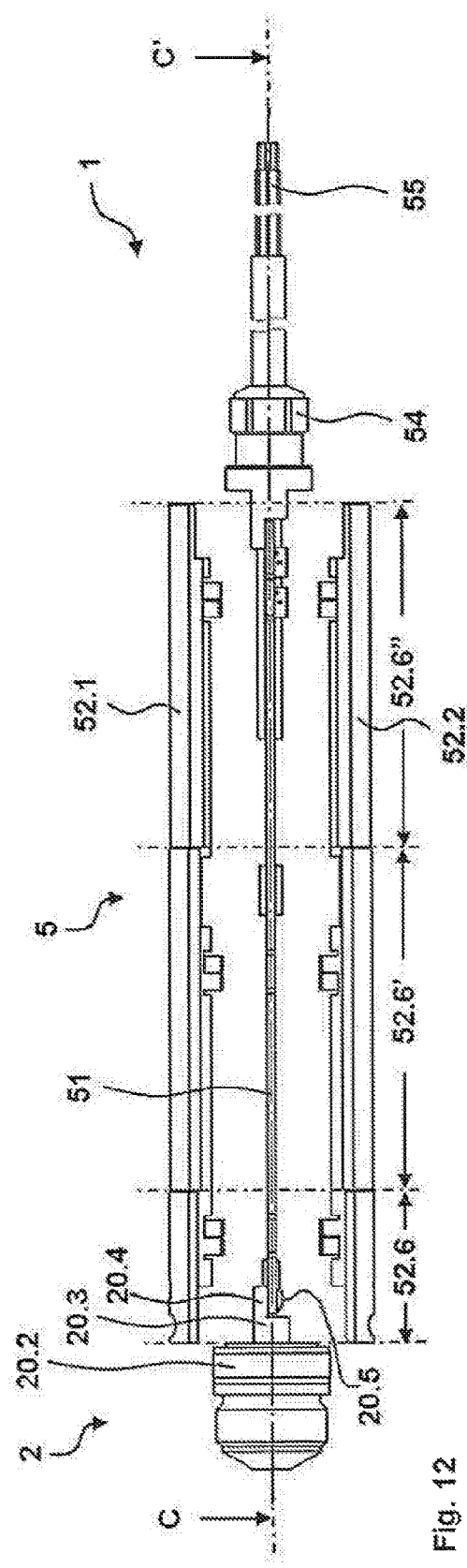
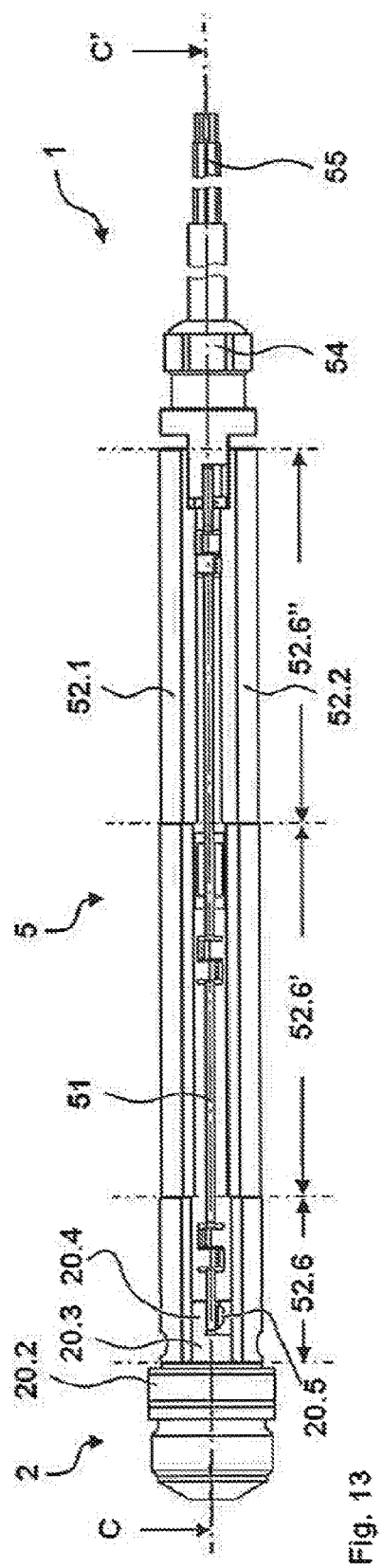
Fig. 12
Fig. 13

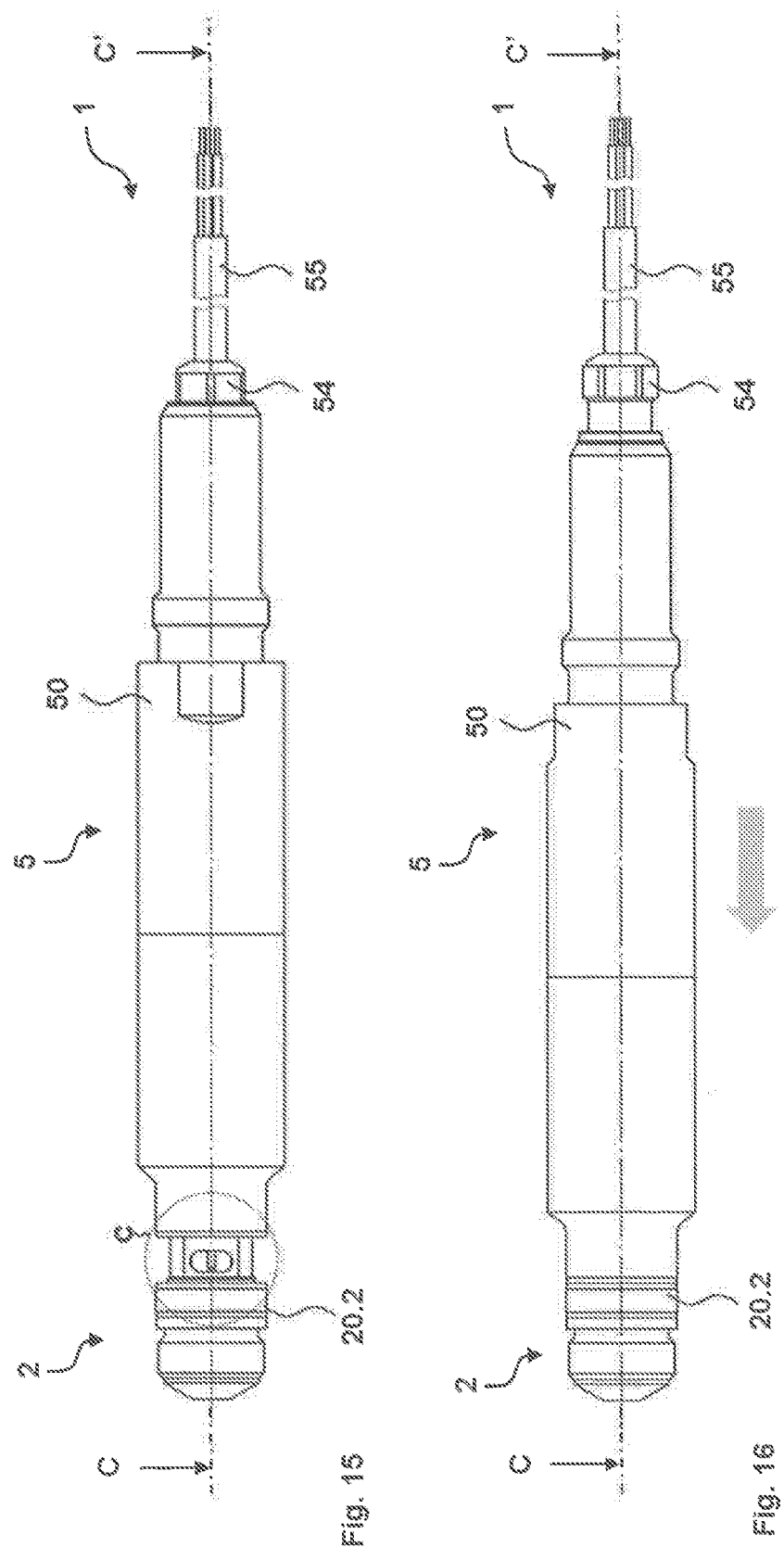

PRESSURE SENSOR

FIELD OF THE INVENTION

The invention relates to pressure sensors that include a sensor and an evaluation unit connected to the sensor by an electrode arrangement and to a process of manufacturing such pressure sensors.

BACKGROUND

Piezoelectric pressure sensors are known and are widely used. Thus, they are used in pressure indexing of internal combustion engines to detect a cylinder pressure prevailing in a pressure chamber as a function of the crankshaft position or a time. Internal combustion engines include four-stroke engines and two-stroke engines such as gasoline engines, diesel engines, Wankel engines, etc. In marine diesel engines, they are used for long-term monitoring of a cylinder pressure. Piezoelectric pressure sensors are used to monitor fast pressure profiles that usually are in the range of 150 to 250 bar but including pressure peaks of 500 bar and higher if pre-ignition and engine knocking occur. However, piezoelectric pressure sensors also can be used in pressure monitoring in jet engines, gas turbines, steam turbines, steam engines, etc.

U.S. Pat. No. 3,364,368, which is hereby incorporated herein by this reference for all purposes, discloses one such piezoelectric pressure sensor that includes a membrane that protrudes directly into the pressure chamber through a bore in the pressure chamber. An edge of the membrane is welded to a housing of the piezoelectric pressure sensor. The pressure profile captured by the membrane acts onto a piezoelectric sensor that is arranged within the housing and near the membrane. The pressure profile generates electric polarization charges on the piezoelectric sensor, and these charges are transmitted electrically as signals via an electrode. The signals are proportional to the magnitudes of the pressures that constitute the pressure profile. The electrode is arranged on the piezoelectric sensor. By means of an electrical conductor, the signals are transmitted electrically from the electrode to a socket for a plug connection of a signal cable that leads to an evaluation unit. The socket is arranged on a side of the housing that faces away from the membrane.

Additionally, U.S. Pat. No. 4,675,643, which is hereby incorporated herein by this reference for all purposes, discloses a piezoresistive pressure sensor in which a sensor with piezoresistors applied thereon generates signals under the action of a pressure profile detected by a membrane. Electrodes are electrically connected to the terminals of the piezoresistors and transmit the signals into an evaluation unit via feedthroughs in the form of slide bushings from a housing of the sensor and via contact surfaces to strands of electrical conductors.

In fact, during continuous use the pressure sensor is exposed to strong engine vibrations and high temperatures of 200° C. and above. These may lead to micro friction and fretting corrosion at the contact surfaces of electrodes, terminals, plug connections and feedthroughs, thereby leading to weakening of the mechanical stability of the signal transmission. In addition, outgassing of the signal cable sheath may occur at high temperatures, and such gases cross-link locally by friction polymerization and form deposits on the contact surfaces of electrodes, terminals, plug connections and feedthroughs. Furthermore, diffusion of base metals and local build-up of oxide layers on contact surfaces of electrodes, terminals, plug connections and feedthroughs may occur at high temperatures. These effects may occur separately or in combination. As a result, the electrical resistance during signal transmission may change. Thus, the electrical contact resistance may increase from the mΩ range by several orders of magnitude into the MO range and distort the signals transmitted to the evaluation unit, thereby resulting in incorrect signal evaluations. Generally, ensuring an electrical insulation of the signal transmission at high temperatures is very important because electrical leakage currents may occur at components of the pressure sensor, and such electrical leakage currents may distort the signal transmission. Furthermore, different expansion coefficients of the components of the pressure sensor may lead to local mechanical stresses at high temperatures. Finally, the components of the pressure sensor may age prematurely at high temperatures. Such thermally induced mechanical stresses and such premature aging have detrimental effects on the service life of the pressure sensor.

A first object of the present invention is to provide a pressure sensor wherein signal distortion in signal transmission is effectively prevented. Another object of the present invention is to provide a pressure sensor wherein the signal output and the evaluation unit are mechanically stable, even with strong permanent engine vibrations. It is an additional object of the present invention to provide a pressure sensor in which the components thereof are largely devoid of mechanical stresses and premature aging even at high temperatures. Finally, it would be desirable to be able to provide a process for the cost-effective manufacture of a pressure sensor having these attributes.

SUMMARY OF THE INVENTION

The invention relates to a pressure sensor that includes a sensor assembly and an evaluation unit. The sensor assembly includes a sensor and an electrode arrangement. The sensor responds to a pressure profile by generating electrical signals. The electrode arrangement transmits the signals to the evaluation unit, which includes an electric circuit board that is connected by material bonding to the electrode arrangement.

The material bond between the electrode arrangement and the electric circuit board prevents the occurrence of micro friction, fretting corrosion, friction polymerization or build-up of an oxide layer on contact surfaces of plug connections or feedthroughs during use of the pressure sensor, thereby effectively preventing signal distortion. Furthermore, this material bond is mechanically stable and can permanently withstand strong engine vibrations.

The invention also relates to a process of manufacturing such a pressure sensor. In this manufacturing process, a sensor assembly is provided as a semi-finished product, said sensor assembly including a sensor, preferably a piezoelectric sensor, and an electrode arrangement. An evaluation unit is provided with an electric circuit board. A material bond is used to join the electrode arrangement with the electric circuit board in certain regions of the electric circuit board and the electrode arrangement.

Thus, a pressure sensor is formed by means of the material bond between the electrode arrangement of the sensor assembly and the electric circuit board of the evaluation unit. This enables the combination of variations of the sensor assembly directly with variations of the evaluation unit to form a pressure sensor. Thus, from a small number of semi-finished products containing functionally compatible parts, a variety of different pressure sensors can be produced, thereby making manufacturing cost-effective.

BRIEF DESCRIPTION OF THE DRAWINGS

In the following, the invention will be explained in more detail by way of examples referring to the Figures in which:

FIG. 1 shows a cross-sectional view through a first embodiment of a piezoelectric pressure sensor with sensor assembly and evaluation unit;

FIG. 2 shows a cross-sectional view through a second embodiment of a piezoelectric pressure sensor with sensor assembly and evaluation unit;

FIG. 5 shows a side view of an electric circuit board of the first embodiment of the piezoelectric pressure sensor according to FIG. 1 or 4;

FIG. 6 shows a top view of the electric circuit board of the first embodiment of the piezoelectric pressure sensor according to FIG. 1, 4, or 5;

FIG. 12 shows a view of a portion of the first embodiment of the piezoelectric pressure sensor according to FIG. 4 during fitting of the electrical insulation element on top;

FIG. 13 shows a view of a portion of the first embodiment of the piezoelectric pressure sensor according to FIG. 4 or 12 after fitting of the electrical insulation element;

FIG. 15 shows a top view of the first embodiment of the piezoelectric pressure sensor according to FIG. 1, 4, 12 or 13 prior to making the material bond between the electrode arrangement of the sensor assembly and the electric circuit board of the evaluation unit;

FIG. 16 shows a top view of the first embodiment of the piezoelectric pressure sensor according to FIG. 1, 4, 12, 13 or 15 after the material bond of the electrode arrangement of the sensor assembly to the electric circuit board of the evaluation unit has been made.

DESCRIPTION OF EXEMPLARY EMBODIMENTS OF THE INVENTION

Figure 14:
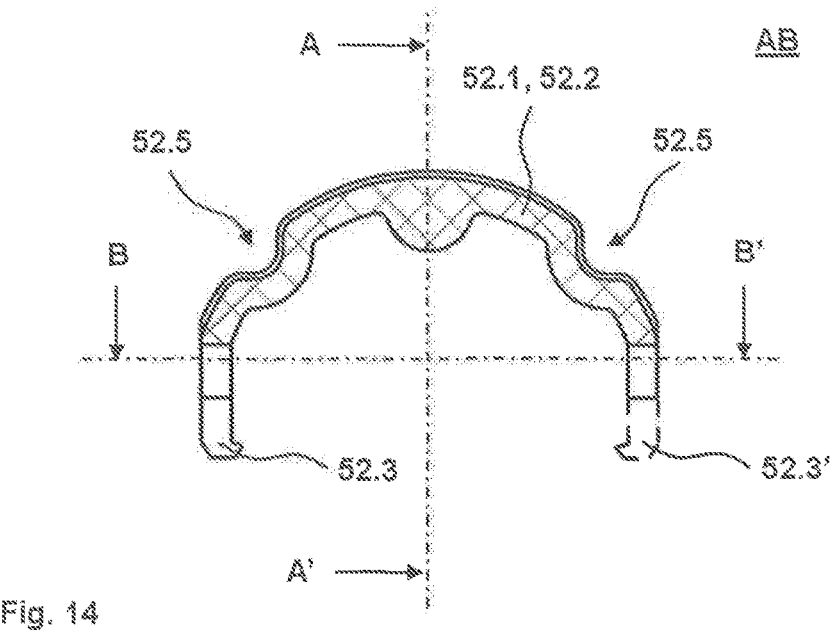
FIG. 14 shows in a cross-sectional view looking down the longitudinal axis C-C', the electrical insulation element according to FIG. 12 or 13.

FIGS. 1 and 2 show sections through two embodiments of the piezoelectric pressure sensor 1 according to the invention. The sections are shown along a longitudinal axis CC' of the mounted ready-to-use piezoelectric pressure sensor 1. The longitudinal axis CC', a vertical axis AA' (FIG. 14) and a horizontal axis BB' (FIG. 14) are perpendicular to each other. A direction along the longitudinal axis CC' is called also a longitudinal direction, a direction perpendicular to the longitudinal direction is also called a radial direction. As shown in FIG. 14, the vertical axis AA' and the horizontal axis BB' span a radial plane AB. Radial directions lie within the radial plane AB. In cross section, the piezoelectric pressure sensor 1 and its components are generally circular with the center point lying on the longitudinal axis CC'. The adverb "generally" includes a variation from the circular form of ±10%. Knowing the present invention, the piezoelectric pressure sensor and its components also may be rectangular, polygonal, etc. in cross section. Thus, an electric circuit board 51 is rectangular, for example.

The components of the piezoelectric pressure sensor 1 may be mechanically contacted with each other or may be mechanically connected to each other. In the sense of the invention, a mechanical contact means that several components are merely placed in direct contact with each other, while in the case of a mechanical connection several components are fixed to each other by means of material bonding, force closure or form closure. Thus, a mechanical contact is not the same as a mechanical connection. A mechanical contact is not pressure-tight. The adjective "pressure-tight" refers to resistance against pressure profiles of 10 bar and more.

By material bonding is meant connection effected by soldering or welding for example. By form closure is meant positive fit joints such as by bolted joints or snap joints that are intended to be reversible without damaging either of the joined elements. By force closure is meant a force fit joint between two elements in contact with each other that requires the application of force to at least one of the elements by a tool in order to effect the connection such as screwed joints or riveted joints or press-fit joints, and while these are in some sense reversible, there might be damage done by the actions required for separation of the two elements. Another type of force closure would be joints held together by magnetic force attraction, yet these could be separated without damaging either of the joined elements.

Figure 3:
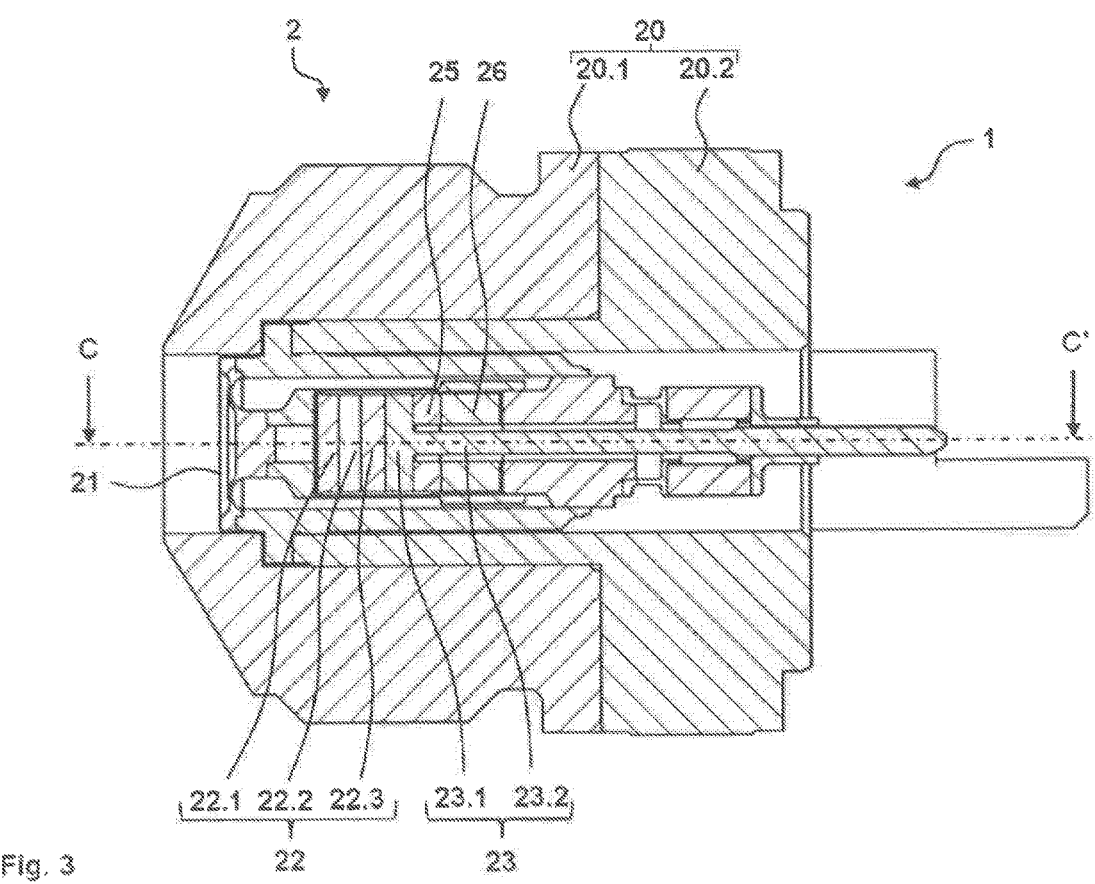
FIG. 3 shows an enlarged cross-sectional view through a portion of a presently preferred embodiment of the sensor assembly according to FIG. 1 or 2.
Figure 11:
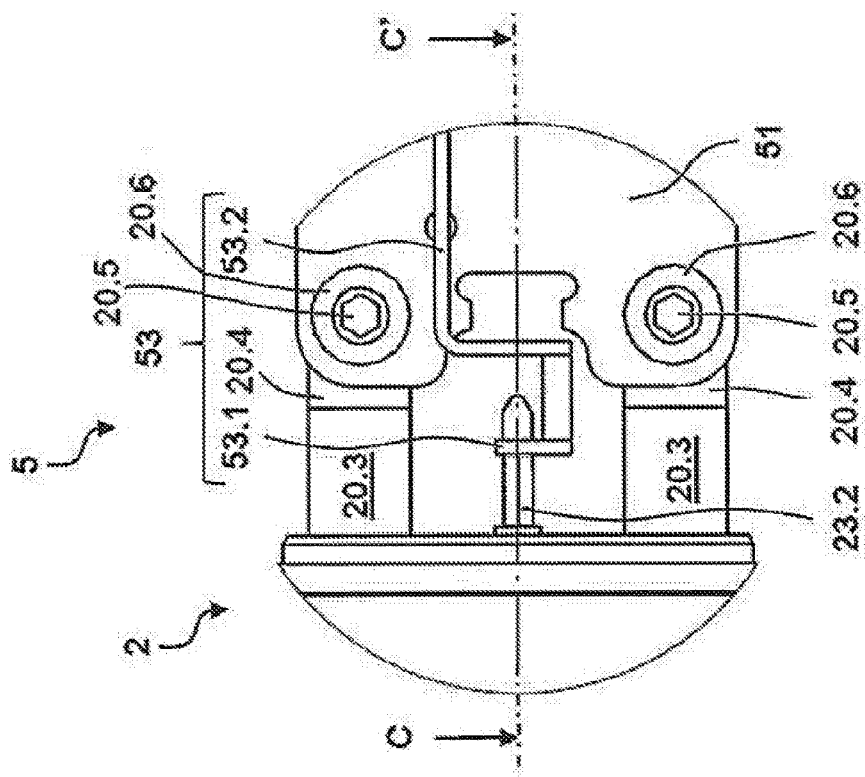
FIG. 11 shows an enlarged top view of an area B of the second embodiment of the piezoelectric pressure sensor according to FIG. 7.
Figure 10:
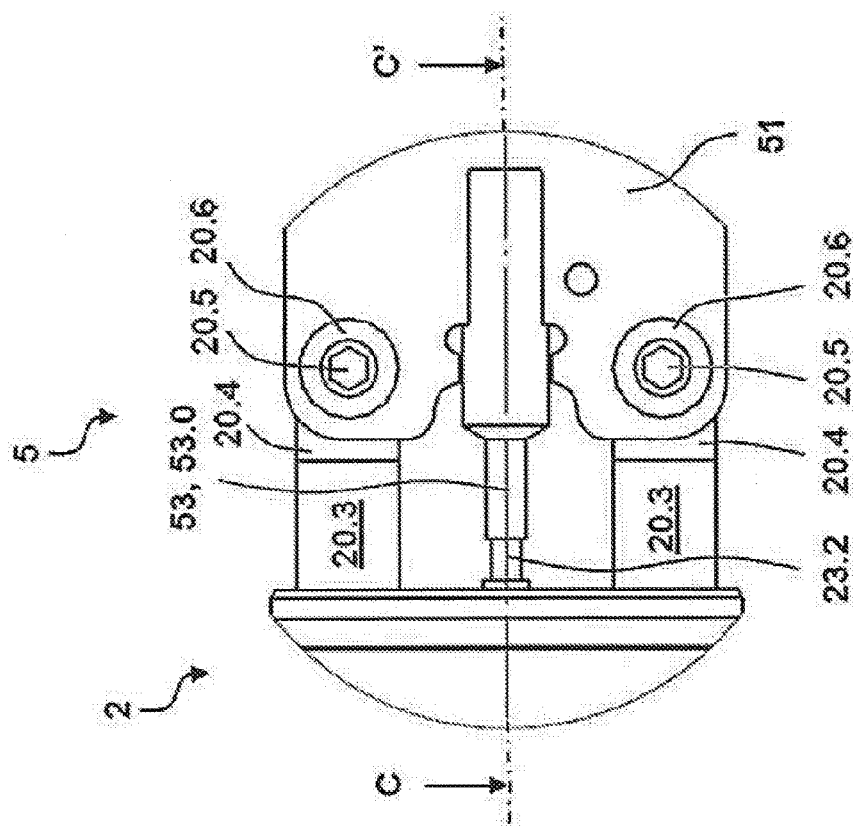
FIG. 10 shows an enlarged top view of an area A of the first embodiment of the piezoelectric pressure sensor according to FIG. 4.
Figure 17:
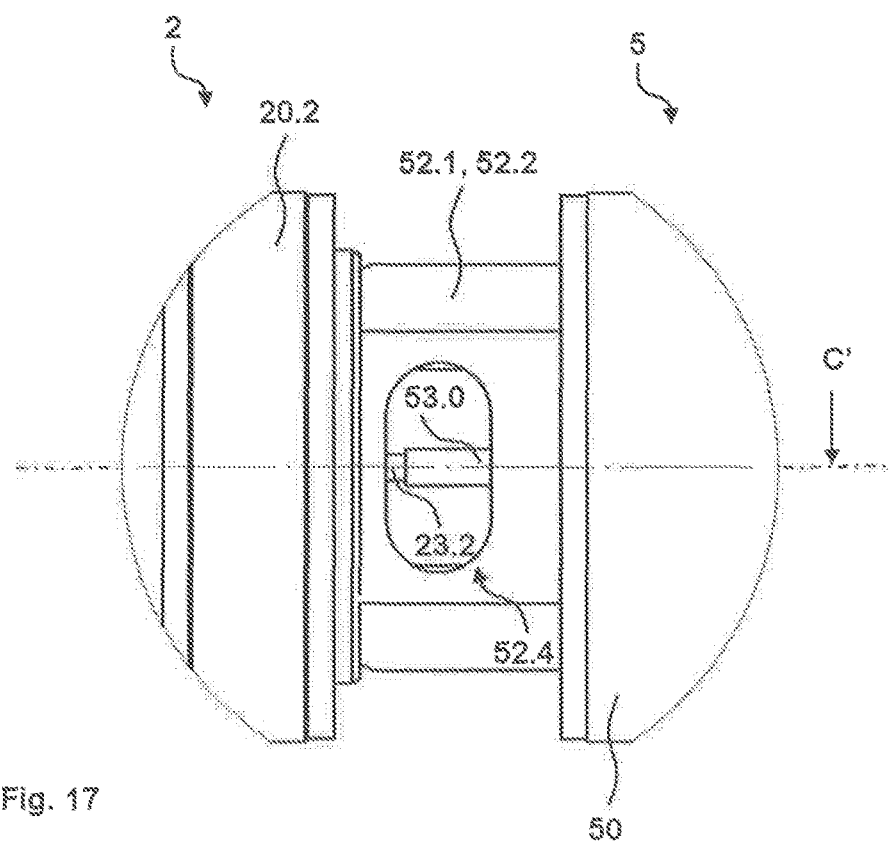
FIG. 17 shows an enlarged top view of an area C of the first embodiment of the piezoelectric pressure sensor according to FIG. 15.

As shown in FIGS. 1 and 2, an embodiment of a piezoelectric pressure sensor 1 in accordance with the present invention includes a sensor assembly 2 and an evaluation unit 5. As shown in FIGS. 1 and 2, the evaluation unit 5 is electrically and mechanically connected directly to the sensor assembly 2. FIG. 3 shows the sensor assembly 2 as a semi-finished product. The evaluation unit 5 also is a semi-finished product having multiple components, as represented in FIGS. 4 to 9 and 12 to 14. FIGS. 10, 11 and 17 show enlarged top views of areas A (taken from FIG. 4), B (taken from FIG. 7) and C (taken from FIG. 15) of the electrical and mechanical connection of the sensor assembly 2 to the evaluation unit 5. Furthermore, FIGS. 15 and 16 show views of the process of manufacturing the electrical and mechanical connection of the sensor assembly 2 to the evaluation unit 5.

As shown in FIGS. 1 and 2 for example, the sensor assembly 2 is arranged in a front area of the piezoelectric pressure sensor 1. As shown in FIG. 3 for example, the sensor assembly 2 includes a membrane 21 and a sensor housing assembly 20 that can include a sealing cone 20.1 and a sensor flange 20.2. As shown in FIG. 3 for example, some embodiments of the sensor housing assembly 20 can include an anti-strain sleeve, which desirably can be formed having a circumferentially continuous flange extending radially from the front thereof and that extends into a complementarily shaped recess that is defined between the front edge of the sensor flange 20.2 and a rearwardly facing front ledge of the sealing cone 20.1. In such embodiments, the anti-strain sleeve is permanently connected as by welding to the radially inwardly facing surface of a front portion of the sensor flange 20.2 and welded to the front edge of the sensor flange 20.2. Additionally, the front edge of the anti-strain sleeve is permanently connected, as by material bonding such as welding for example, to the rearwardly facing surface of the circumferentially outer portion of the membrane 2. In an alternative embodiment, the forward end of the sensor flange 20.2 is configured in a way that emulates the presence of the anti-strain sleeve, which thus need not be provided as a separate component. In a further alternative embodiment, the sensor housing assembly 20 can be provided as a unitary component instead of two or more multiple components (e.g., 20.1, 20.2 and/or anti-strain sleeve) that are permanently mechanically connected together to become integrated as a single component.

As shown in FIG. 3 for example, the sensor assembly 2 also includes a piezoelectric sensor 22 and an electrode arrangement 23. The piezoelectric pressure sensor 1 is mechanically connected to a wall of a pressure chamber, and the membrane 21 protrudes directly into the pressure chamber through a bore that is defined through the wall. The mechanical connection between the wall and the piezoelectric pressure sensor 1 desirably is made by a force closure or by a form closure. During use of the piezoelectric pressure sensor 1, the front area of the piezoelectric pressure sensor 1 is permanently exposed to strong engine vibrations and high temperatures in the vicinity of the pressure chamber. The terms "front" and "rear" are used for the piezoelectric pressure sensor 1 and its components to indicate by "front" an area that is oriented towards the membrane 21, while "rear" refers to an area that faces away from the membrane 21.

As shown in FIG. 3 for example, the sensor flange 20.2, which is also referred to as the reinforcement casing 20.2, accommodates the piezoelectric sensor 22 and components of the piezoelectric pressure sensor 1 adjacent to the piezoelectric sensor 22. Sealing cone 20.1 and sensor flange 20.2 desirably consist of mechanically flexible material such as pure metals, nickel alloys, cobalt alloys, iron alloys, etc. and are mechanically connected to each other. The mechanical connection between the sealing cone 20.1 and the sensor flange 20.2 desirably is achieved by means of material bonding such as welding, diffusion welding, thermo compression bonding, soldering, etc. By being composed of these materials and connected in this way, the sealing cone 20.1 and the sensor flange 20.2 can absorb mechanical tensions originating from the mechanical connection of the piezoelectric pressure sensor 1 to the wall of the pressure chamber. If such mechanical tensions were transmitted via the sensor housing assembly 20 onto the piezoelectric sensor 22, they would disturb the detection of the pressure profile as well as distort the signals generated by the piezoelectric sensor 22. Accordingly, the sensor housing assembly 20 also shields the piezoelectric sensor 22 by preventing the transfer of mechanical tensions originating from the mechanical connection of the piezoelectric pressure sensor 1 to the wall of the pressure chamber. Knowing the present invention, and as mentioned above, the skilled person also can manufacture the sensor housing assembly 20 without a sensor flange 20.2 defining a separate component from the sealing cone 20.1 so that the sensor housing assembly 20 consists only of a sealing cone 20.1 as a unitary structure that emulates the configuration of the combined sealing cone 20.1, sensor flange 20.2 and/or anti-strain sleeve shown in FIG. 3.

The frontal membrane 21 consists of mechanically flexible material such as pure metals, nickel alloys, cobalt alloys, iron alloys, etc. As shown in FIG. 3 for example, a circumferentially outwardly disposed edge of the membrane 21 is mechanically connected around its entire perimeter to the reinforcement casing 20.2. An annular shaped area of the centrally disposed and rearwardly-facing end of the membrane desirably can be mechanically connected to the entire perimeter of the front end of a pre-stressing sleeve, which desirably is formed as a hollow cylindrically shaped component. The rear end of the pre-stressing sleeve desirably can be mechanically connected to the front end of a pre-stressing body, which desirably is formed as a hollow cylindrically shaped component. These mechanical connections desirably are carried out by means of material bonding such as welding, diffusion welding, thermo compression bonding, soldering, etc. A pressure captured by the membrane 21 acts as a normal force onto the piezoelectric sensor 22. Details of the pre-stressing sleeve and pre-stressing body are disclosed in U.S. patent application Ser. No. 15/215,712, filed Jul. 21, 2016, which is hereby incorporated herein by this reference for all purposes.

As shown in FIG. 3 for example, the piezoelectric sensor 22 is positioned in direct alignment behind the membrane 21 on the longitudinal axis CC' and includes a first support element 22.1, a second support element 22.3 as well as a piezoelectric sensor element 22.2. Relative to the longitudinal axis CC', the piezoelectric sensor element 22.2 is arranged between the first and second support elements 22.1 and 22.3, and this arrangement evenly distributes the normal force onto the piezoelectric sensor element 22.2. The support elements 22.1, 22.3 desirably are in the form of cylinders or hollow cylinders and desirably consist of electrically conductive and mechanically rigid material such as pure metals, nickel alloys, cobalt alloys, iron alloys, electrically conductive ceramics, ceramics having an electrically conductive coating, etc. The surface of the membrane 21 is in mechanical contact with the first support element 22.1. Furthermore, the first support element 22.1 and the second support element 22.3 also mechanically contact the piezoelectric sensor element 22.2 via their surfaces. These surface mechanical contacts also desirably may be made through mechanical connections, which desirably are made by material bonding such as diffusion welding, thermo compression bonding, soldering, etc. Knowing the present invention, those skilled in the art alternatively can implement the piezoelectric sensor 22 without support elements (22.1 and 22.3) or can implement a piezoelectric sensor 22 with only one support element (22.1) arranged between the membrane 21 and the piezoelectric sensor element 22.2.

The piezoelectric sensor element 22.2 desirably is cylindrical or hollow-cylindrical in shape and consists of piezoelectric material such as quartz ($SiO_2$ monocrystal), calcium gallo-germanate ($Ca_3Ga_2Ge_4O_{14}$ or CGG), langasite ($La_3Ga_5SiO_{14}$ or LGS), tourmaline, gallium orthophosphate, etc. The piezoelectric sensor element 22.2 is oriented to have a high sensitivity for the pressure profile to be captured. Advantageously, the piezoelectric sensor element 22.2 is oriented in such a way that the normal force affecting the membrane 21 acts on the same surfaces of the piezoelectric sensor element 22.2 that experience the changes in negative and positive electric polarization attributable to pressures affecting the membrane 21. The normal force can act onto the surface of the piezoelectric sensor element 22.2 in a loading or relieving manner. Under a mechanical load due to the normal force, negative polarization charges are generated and migrate onto one of the opposite surfaces of the piezoelectric sensor element 22.2. If the normal force has a relieving impact, negative polarization charges are drawn away from one of the opposite surfaces of the piezoelectric sensor element 22.2 and this directional migration of negative charge produces an electrical effect as if positive polarization charges are produced. Knowing the present invention, the skilled artisan can of course use more than one piezoelectric sensor element 22.2.

As shown in FIG. 3 for example, the electrode arrangement 23 is positioned along the longitudinal axis CC' on the side of the piezoelectric sensor 22 that faces away from the membrane 21 directly behind the piezoelectric sensor 22. The electrode arrangement 23 desirably has a cylindrically shaped charge pick-off 23.1 at the front opposite end thereof and a rod-shaped charge output 23.2 at the opposite back end thereof. The charge pick-off 23.1 desirably can take the form of a circular disk having a much larger diameter (and surface area) than the diameter of the charge output 23.2, which desirably elongates along the longitudinal axis CC' from the rear surface of the charge pick-off 23.1. The charge pick-off 23.1 and the charge output 23.2 are electrically connected to each other. The electrode arrangement 23 desirably consists of an electrically conductive material such as pure metals, nickel alloys, cobalt alloys, iron alloys, etc. The charge pick-off 23.1 and the charge output 23.2 desirably may be formed integrally by mechanically connecting the charge pick-off 23.1 to the charge output 23.2 in a permanent way, which desirably can be effected by material bonding. However, any type of mechanical connection may be used such as, for example, form closure and force closure. Alternatively, the charge pick-off 23.1 and the charge output 23.2 desirably may be formed as a unitary structure such as would be the case if a single metal stock was milled on a lathe to form the charge pick-off 23.1 at one end of the stock and the charge output 23.2 at the other end of the stock. A similar unitary element forming the charge pick-off 23.1 and the charge output 23.2 also could be obtained in a single molding operation. The material of the electrode arrangement 23 preferably has a coefficient of linear thermal expansion in the range of 10 to 18 ppm/° C., preferably in the range of 10 to 12 ppm/° C.

As shown in FIG. 3 for example, the entire front surface of the charge pick-off 23.1 desirably is in electrical contact with a rear surface of the second support element 22.3 where charges are discharged. In so doing, all areas where high local electric voltages and electrical leakage currents may occur under the impact of a normal force are sure to be covered by such contact. The surface electric contact of the charge pick-off 23.1 and the second support element 22.3 is achieved by bringing the surfaces thereof in mechanical contact with each other. Knowing the present invention, the skilled artisan also can achieve the surface mechanical contact by a mechanical connection, which desirably can be achieved by means of material bonding such as diffusion welding, thermo compression bonding, soldering, etc.

Electric polarization charges with a first polarity are received as signals by the electrode arrangement 23 and are transmitted to the evaluation unit 5. Electric polarization charges with a second polarity are received via the membrane 21 or a clamping sleeve from the grounded sensor flange 20.2 as signals from the return line and are fed to the evaluation unit 5. The electrical current of the signals or the signals from the return line, respectively, is on the order of 1 pA and thus very small. Electric signals this small are subject to being distorted by electrical leakage currents through the electrical insulation material. Although not shown in the Figures, a skilled artisan knowing the present invention also can implement the signal transmission by means of a shield (guard) made of electrically conductive material that surrounds the signal line and that is on a reference potential of the signal line. In this case, electrical leakage currents flow between the reference potential and guard. No electrical leakage currents flow between guard and signal line because the electrical potential difference between them is zero. The shield may surround the signal line, signal conductors of the electric circuit board, electrical terminals of electronic components of the electric circuit board, etc. Furthermore, those skilled in the art also can use electric polarization charges with a second polarity as further signals. Thus, the skilled artisan can transmit the electric polarization charges with the second polarity from the ground potential in an electrically insulated manner to the evaluation unit. This may be achieved by an electrical connection by means of material bonding such as crimping, etc. of the sensor housing assembly 20 to an electromagnetic shielding of the evaluation unit housing 50 (described more fully below).

As shown in FIG. 3 for example, the electrode arrangement 23 is electrically insulated against the sensor flange 20.2 by an electric insulation body 25, which desirably has the form of a hollow cylinder and desirably is made of electrically insulating and mechanically rigid material such as ceramics, $Al_2O_3$ ceramics, sapphire, etc. On the longitudinal axis CC', the electric insulation body 25 is positioned directly behind the charge pick-off 23.1 on the side of the charge pick-off 23.1 that faces away from the membrane 21. The electric insulation body 25 is in mechanical contact over its entire surface with the charge pick-off 23.1. The charge output 23.2 extends up to an end of the sensor assembly 2 that faces away from the piezoelectric sensor 22.

A compensation element 26 desirably can be provided to compensate for different thermal expansion coefficients of the components of the piezoelectric pressure sensor 1. As shown in FIG. 3 for example, the compensation element 26 desirably has the form of a hollow cylinder and is made of mechanically rigid material such as from pure metals, nickel alloys, cobalt alloys, iron alloys, ceramics, $Al_2O_3$ ceramics, sapphire, etc. On the longitudinal axis CC', the compensation element 26 is disposed directly behind the electric insulation body 25 on the side of the electric insulation body 25 facing away from the membrane 21. In the embodiment of the sensor assembly 2 according to FIG. 3, the compensation element 26 mechanically contacts the electric insulation body 25 over its entire surface. Knowing the present invention, those skilled in the art also can arrange the compensation element on the side of the charge pick-off that faces the membrane 21 where it replaces the support element. The compensation element 26 may be arranged between the membrane 21 and the piezoelectric sensor element 22.2 instead of the first support element 22.1. However, the compensation element 26 also may be arranged between the piezoelectric sensor element 22.2 and the charge pick-off 23.1 instead of the second support element 22.3.

As shown in FIGS. 1 and 2 for example, the evaluation unit 5 includes a circuit board housing 50 and an electric circuit board 51. The circuit board housing 50 is also called the evaluation unit housing 50. As shown in FIGS. 12, 13, 14 and 17 for example, the evaluation unit 5 desirably includes a reinforcement element 52.1, 52.2. The electric circuit board 51 and the reinforcement element 52.1, 52.2 are accommodated in the evaluation unit housing 50 of the evaluation unit 5. Referring to FIGS. 1, 2, 12 and 13 for example, it can be appreciated that the reinforcement element 52.1, 52.2 is arranged in the radial direction between the electric circuit board 51 and the evaluation unit housing 50. The reinforcement element 52.1, 52.2 is also referred to as electrical insulation element 52.1, 52.2.

The electric circuit board 51 consists of a base material such as polytetrafluoroethylene, polyimide, $Al_2O_3$ ceramics, laminates of hydrocarbon-ceramics, etc. The base material is electrically insulating having a specific volume resistance of that is superior to $10^{15}$ Ωcm at room temperature but at least equal to $10^{15}$ Ωcm at room temperature, preferably superior to $10^{16}$ Ωcm at room temperature but at least equal to $10^{16}$ Ωcm at room temperature. The base material forming the electric circuit board 51 desirably is adapted to permanent service temperatures of less than or equal to 280° C. Specifically, the very high specific volume resistance ensures that the signal output cannot be distorted by electrical leakage currents even at permanent service temperatures just below 280°. Preferably, the base material has a thermal coefficient of linear expansion in the range of 10 to 18 ppm/° C., preferably in the range of 10 to 12 ppm/° C. which generally is equal to the thermal coefficient of linear expansion of the charge output 23.2 and/or the electrical connecting element 53 (described more fully below).

The electric circuit board 51 desirably includes a high temperature region 51.1 and a normal temperature region 51.2. As shown in FIGS. 5, 6, 8 and 9 for example, the high temperature region 51.1 is in a front to central area of the electric circuit board 51. The high temperature region 51.1 faces the sensor assembly 2. The normal temperature region 51.2 is in a central to rear area of the electric circuit board 51. The normal temperature region 51.2 faces away from the sensor assembly 2. In the high temperature region 51.1 of the electric circuit board, 51, the permanent service temperature is less than or equal to 280° C. The high temperature region 51.1 preferably extends over 80% of the length of the electric circuit board 51, preferably over 50% of the length of the electric circuit board 51, preferably over 30% of the length of the electric circuit board 51, preferably over 20% of the length of the electric circuit board 51.

The electric circuit board 51 includes electrical signal conductors that are made from electrically conductive material such as from pure metals, nickel alloys, cobalt alloys, iron alloys, etc. A bottom surface of the electrical signal conductors rests on the electric circuit board 51. Preferably, the electrical signal conductors are multi-layered, and a first layer consists of a palladium nickel alloy while a second layer is made from gold. The first layer of a palladium nickel alloy is directly plated onto the base plate of the circuit board 51 while the second layer made from gold is vapor-deposited onto the first layer of a palladium nickel alloy. The first layer of a palladium nickel alloy serves as a barrier for diffusion of gold of the second layer into the base material of the electric circuit board 51. The second layer of gold serves as protection against corrosion having a low electrical resistance and very good soldering properties. A top surface of the electrical signal leads either is open (surface microstrip) or covered with solder mask (coated microstrip). Preferably, in order to prevent heat conduction via the electrically conductive material of the electrical signal conductors from the high temperature region 51.1 to the low temperature region 51.2, no electric signal conductors are arranged in the high temperature region 51.1 of the electric circuit board 51. Alternatively, in order to minimize heat conduction via the electrically conductive material of the electrical signal conductors from the high temperature region 51.1 to the low temperature region 51.2, only electrical signal conductors for signal transmission are arranged in the high temperature region 51.1 of the electric circuit board 51. With the exception of the electrical signal conductors for signal transmission, no other electrical signal conductors are arranged in the high temperature region 51.1 of the electric circuit board 51 in this alternative embodiment.

On the electric circuit board 51 are mounted electronic components such as electric resistors, electric capacitors, semiconductors, processors, etc. In order to avoid premature aging of the electronic components, they desirably are positioned only in the normal temperature region 51.2 of the electric circuit board 51. In the normal temperature region 51.2, the permanent service temperature is no greater than 120° C. so that the electronic components must only comply with an extended industrial standard of an upper permanent service temperature of +125° C. and thus are relatively inexpensive and readily available. Those skilled in the art being aware of the present invention may of course also use a relatively expensive electric circuit board 51 such as one with a thick layer with a base made of nickel alloys, cobalt alloys, iron alloys, $Al_2O_3$ ceramics, etc. with a permanent service temperature of more than 500° C.

Solder mask desirably is applied to the electric circuit board 51 and protects the electronic components and electrical signal conductors from corrosion. Solder mask also prevents wetting of the base material of the electric circuit board 51 with soldering material during mounting of the electric circuit board 51 with electronic components and in this manner prevents the formation of accidental electrical connections during mounting. Advantageously, no solder mask is applied in the high temperature region 51.1 of the electric circuit board 51. However, the specific volume resistance of solder mask at room temperature is much smaller than $10^{14}$ Ωcm so that at high temperatures just below 280° C. there is no longer achieved a sufficient resistance to leakage currents which can lead to signal distortion during signal transmission. Furthermore, solder mask is not permanently heat-resistant at high temperatures just below 280° C. and may melt or burn and, thus, impair the function of the evaluation unit.

Furthermore, as shown in FIGS. 1, 2, 4, 5, 6, 7, 8, 9, 10 and 11 for example, the evaluation unit 5 desirably includes an electrical connection element 53, a signal cable flange 54 and a signal cable 55. The electrical connecting element 53 is electrically connected to electronic components via at least one electrical signal conductor. The electrical connection desirably is made by means of material bonding such as soldering, crimping etc. Signals received from the electrode arrangement 23 are fed via the charge output 23.2 to the electrical connection element 53 of the evaluation unit 5 and are fed from the electrical connection element 53 of the evaluation unit 5 via the electrical signal conductor to the electric circuit board 51. The signal transmission from the electrode arrangement 23 to the evaluation unit 5 occurs through material bonding only. Preferably, the signal transfer occurs from an electrical contact of the surface of the sensor 22 with the electrode arrangement 23 to the evaluation unit 5 only through material bonding. Within the evaluation unit 5, signals may be electrically amplified as well as subjected to initial evaluation. Preferably, both signals from the charge output 23.2 and signals from the return line are amplified and evaluated in the evaluation unit 5. The signals from the charge output 23.2 and signals from the return line are proportional to the amount of the pressure profile captured by the membrane 21. The signal cable 55 is configured and connected so as to transmit both amplified signals from the charge output 23.2 and return line signals on the one hand and on the other hand both signals from the charge output 23.2 and return line signals that already have been evaluated. Front ends of the signal cables 55 are electrically and mechanically connected to the normal temperature region 51.2 of the electric circuit board 51. This electrical and mechanical connection desirably is achieved by means of material bonding such as soldering, crimping, etc. Knowing the present invention, the skilled artisan also can mechanically and electrically connect the charge output 23.2 directly to a signal conductor of the electric circuit board 51 so that no electrical connection element 53 is required for signal transmission. This electrical and mechanical connection is also desirably made by material bonding such as soldering, crimping, etc.

Figure 4:
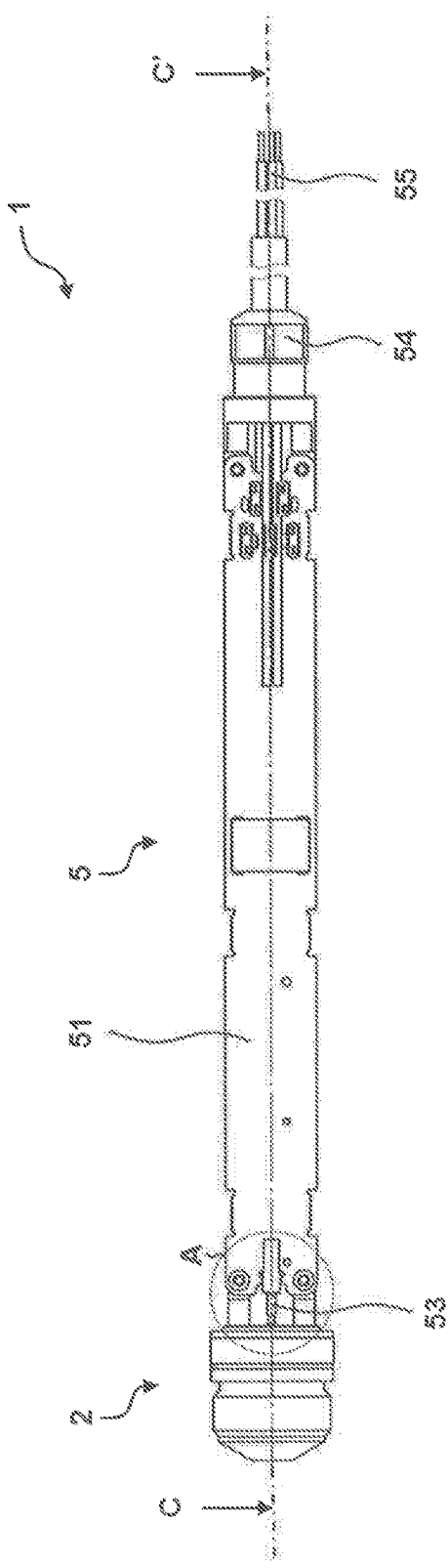
FIG. 4 shows a top view of a portion of the first embodiment of the piezoelectric pressure sensor according to FIG. 1 without evaluation unit housing and without electrical insulation element.
Figure 7:
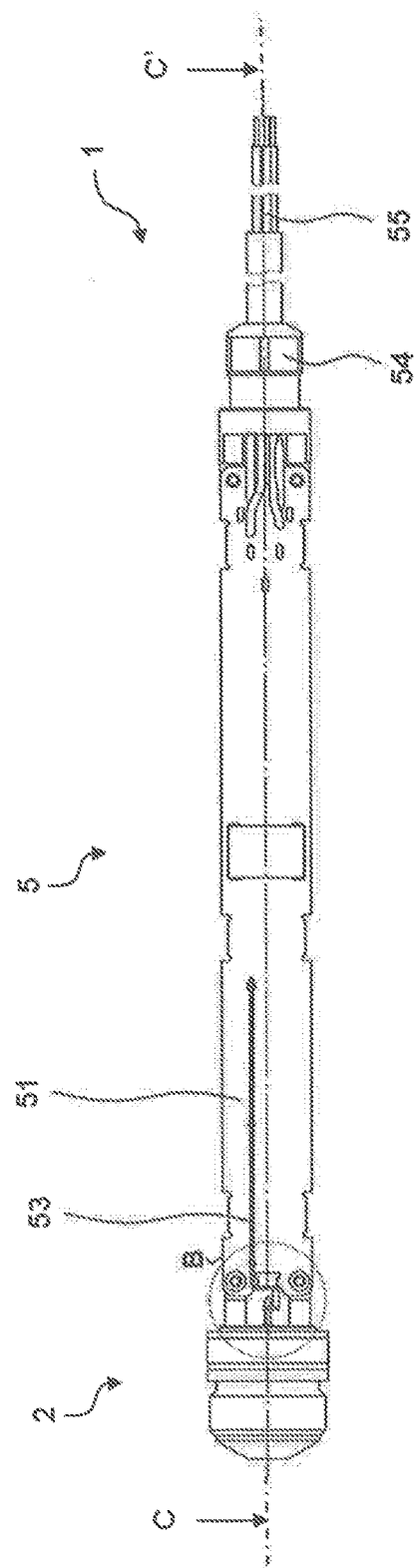
FIG. 7 shows a top view of a portion of the second embodiment of the piezoelectric pressure sensor according to FIG. 2 without evaluation unit housing and without electrical insulation element.
Figures 8, 9:
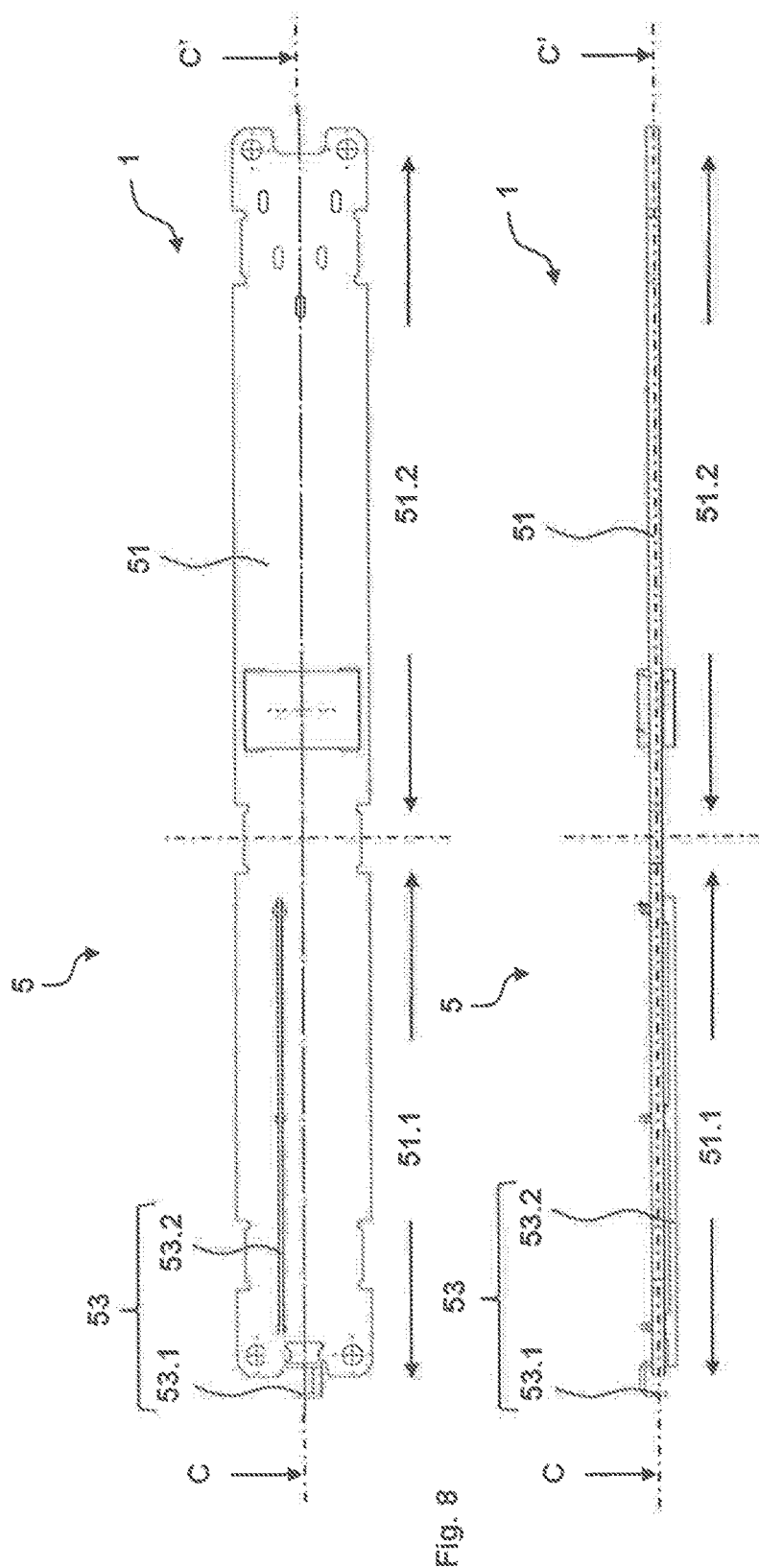
FIG. 8 shows a top view of the electric circuit board of the second embodiment of the piezoelectric pressure sensor according to FIG. 2 or 7.
FIG. 9 shows a side view of the electric circuit board of the second embodiment of the piezoelectric pressure sensor according to FIG. 2, 7 or 8.

As shown in FIGS. 4, 10 and 11 for example, the electrical connecting element 53 desirably has the form of a hollow cylinder and consists of electrically conductive material such as pure metals, nickel alloys, cobalt alloys, iron alloys, etc. The material of the electrical connection element 53 preferably has a thermal coefficient of linear expansion in the range of 10 to 18 ppm/° C., preferably in the range of 10 to 12 ppm/° C. Thus, the magnitude of the thermal coefficient of linear expansion of the electrical connection element 53 is comparable to the magnitude of the thermal coefficient of linear expansion of the sensor assembly 2 and/or the electric circuit board 51.

In a first embodiment of a piezoelectric pressure sensor 1 according to FIGS. 1, 4 to 6, 10, 12, 13 and 15 to 17, the electrical connection element 53 desirably includes an adapter 53.0 in the form of a socket. Preferably, the adapter 53.0 is in the form of a socket with a slit. The adapter 53.0 in the form of a socket desirably is arranged in the high temperature region 51.1 of the electric circuit board 51. For signal transmission, the adapter 53.0 in the form of a socket desirably is connected to an electrical signal conductor of the electric circuit board 51 by material bonding, which desirably is achieved by welding, diffusion welding, thermo compression bonding, soldering, etc. Furthermore, the adapter 53.0 in the form of a socket desirably is mechanically connected to the electric circuit board 51. This mechanical connection serves a dual function, both for attachment of the adapter 53.0 on electric circuit board 51 and for signal transmission. Preferably, the mechanical connection is achieved by material bonding such as welding, diffusion welding, thermo compression bonding, soldering, etc. Knowing the present invention, the skilled artisan is also able to implement this dual function mechanical connection through form closure or force closure.

In a second embodiment of a piezoelectric pressure sensor 1 according to FIGS. 2, 7 to 9 and 11, the electrical connection element 53 desirably includes an annular adapter 53.1 and a compensation element 53.2. The annular adapter 53.1 and the compensation element 53.2 are preferably integrally formed, either as a unitary structure or permanently joined together to function as one. The electrical connection element 53 extends along the longitudinal axis CC'. The annular adapter 53.1 is positioned at a front end of the electrical connection element 53. The compensation element 53.2 mechanically supports the annular adapter 53.1. As shown in FIG. 11 for example, the compensation element 53.2 desirably includes at least one bend such as a Z bend, an U bend, an expansion loop, etc. The bend compensates for differences in the thermal coefficients of linear expansion of signal-transmitting components of the piezoelectric pressure sensor 1. The bend also compensates for manufacturing tolerances along the longitudinal axis CC' of components of the sensor assembly 2 and the evaluation unit 5. In the area of the bend, the compensation element 53.2 can expand or contract and thus reduce the occurrence of thermally induced mechanical tensions and/or of manufacturing tolerances to uncritical values. The compensation element 53.2 extends over the high temperature area 51.1 of the electric circuit board 51. Knowing the present invention, those skilled in the art are also able to combine these two embodiments of a piezoelectric pressure sensor 1. Thus, the adapter in the form of a socket of the first embodiment may be combined at the front end of the compensation element of the second embodiment.

Generally, the compensation element 53.2 extends over the entire high temperature region 51.1 of the electric circuit board 51. For signal transmission, the compensation element 53.2 is connected by means of material bonding to a signal conductor of the electric circuit board 51 in the low temperature range 51.2 of the electric circuit board 51. This material bond desirably is made by welding, diffusion welding, thermo compression bonding, soldering, etc. In addition, the compensation element 53.2 is mechanically connected to the electric circuit board 51. For attachment of the compensation element 53.2 on the electric circuit board, 51, the mechanical connection is preferably made by means of form closure and force closure by inserting at least one leg of the compensation element 53.2 into at least one corresponding opening in the high temperature region 51.1 of the electric circuit board 51. The leg desirably is deformable, whether elastically or plastically, and is compressed when the leg is inserted in the opening in the high temperature region 51.1 of the electric circuit board 51. Such compression results in mechanical pre-stressing, which retains the leg in place by means of form closure and force closure. One particularly desirable embodiment of the leg can be provided in the form of a spring such as a flat spiral spring with two spring hinges that are connected to each other at their front and rear ends and are spaced apart in a central region thereof. When the two spring hinges are inserted into the opening, the two spring hinges are elastically deformed in their central regions. Alternatively, the mechanical connection for the attachment of the compensation element 53.2 in the high temperature region 51.1 of the electric circuit board 51 also may be achieved by means of material bonding, which desirably is made by welding, diffusion welding, thermo compression bonding, soldering, etc.

As shown in FIGS. 10 and 11 for example, the charge output 23.2 is joined with the electrical connection element 53. The rear end of charge output 23.2 protrudes along the longitudinal axis CC' into the adapter 53.0 in the form of a socket or the annular adapter 53.1. In this area, an outer surface of the charge output 23.2 relative to longitudinal axis CC' and an inner surface of the adapter 53.0 in the form of a socket or the annular adapter 53.1 relative to longitudinal axis CC' are electrically and mechanically connected to each other. This electrical and mechanical bond desirably is made by material bonding such as welding, diffusion welding, thermo compression bonding, soldering, crimping, etc. Thus, the charge output 23.2 forms a material bond to the electrical connection element 53 in certain areas. This material bonding in certain areas desirably can be achieved by spot welding or by seam welding around the entire perimeter. The material bond prevents the occurrence of micro friction, fretting corrosion, friction polymerization or the build-up of a layer of oxide on contact surfaces of electrodes, terminals, connectors and feedthroughs during use of the piezoelectric pressure sensor 1 and effectively prevents signal distortions. Knowing the present invention, those skilled in the art of course also can use a differently shaped electrical connector 53. Thus, the electrical connection element 53 can have the form of a plate or of a half shell. In such alternative embodiments, the charge output 23.2 does not extend into the electrical connecting element 53. For making the electrical and mechanical connection in such alternative embodiments, the charge output 23.2 is placed onto the electrical connecting element 43 having the form of a plate or a half shell.

The reinforcement element 52.1, 52.2 has the form of a hollow cylinder that elongates along the longitudinal axis CC' and consists of electrically insulating material that is dimensionally stable up to temperatures of at least 120° C., preferably of at least 150° C., such as polyether ether ketone (PEEK), polytetrafluoroethylene, polyimide, hexafluoropropylene vinylidene fluoride copolymer (FKM), etc. The material of the reinforcement element 52.1, 52.2 preferably has a thermal coefficient of linear expansion in the range of 10 to 50 ppm/° C. As shown in FIG. 14 for example, the reinforcement element 52.1, 52.2 is arranged around the electric circuit board 51, and the transverse cross-section of the reinforcement element 52.1, 52.2 lies in the radial plane AB. The reinforcement element 52.1, 52.2 surrounds the electric circuit board 51 in certain areas. The reinforcement element 52.1, 52.2 is arranged between the electric circuit board 51 and the evaluation unit housing 50 with respect to the radial plane AB. Preferably, the reinforcement element 52.1, 52.2 encloses the electric circuit board 51 in certain areas along the longitudinal axis CC'. Preferably, the reinforcement element 52.1, 52.2 fully encloses the electric circuit board 51, which in the representation according to FIG. 14 is also intended to include enclosing by 360° in the radial plane AB. In the longitudinal direction along the longitudinal axis CC', the electric circuit board 51 desirably may penetrate the reinforcement element 52.1, 52.2 in certain areas. For this purpose, the reinforcement element 52.1, 52.2 may have at least one opening through which the electric circuit board 51 also may be visible and accessible from a vantage point that is radially outside the reinforcement element 52.1, 52.2 in certain areas of the reinforcement element 52.1, 52.2.

Preferably, as shown in FIG. 14 for example, the reinforcement element 52.1, 52.2 includes several parts and consists of at least two shells 52.1, 52.2. Preferably, the shells 52.1, 52.2 are identical. Preferably, the shells 52.1, 52.2 are interchangeable parts, thereby lowering production costs. The shells 52.1, 52.2 may be mechanically connected to the electric circuit board 51 and/or mechanically connected to each other. This mechanical connection can be made via form closure and/or material bonding and/or force closure. This mechanical connection may be reversibly without damaging the individual parts, or once connected together the parts are irreversibly detachable without being damaged. Preferably, the two shells 52.1, 52.2 may be mechanically connected to the electric circuit board 51 or to each other via at least one protruding locking element 52.3, 52.3'. Preferably, the locking element 52.3, 52.3' of one of the shells 52.1, 52.2 engages a corresponding opening of the other shell 52.1, 52.2. Preferably, one locking element 52.3, 52.3' of one of the shells 52.1, 52.2 engages the electric circuit board 51 through a corresponding opening of the other shell 52.1, 52.2.

Preferably, the shells 52.1 52.2 are not mirror-symmetrical with respect to the vertical axis AA'. In the transverse cross sectional view of the shell 52.1, 52.2 according to FIG. 14, the two protruding locking elements 52.3, 52.3' of the shell 52.1, 52.2 are arranged to the left and the right of the vertical axis AA'. Along the longitudinal axis CC', the two locking elements 52.3, 52.3' are not arranged in the same radial plane AB; therefore, the locking element 52.3 on the right is represented by a dashed line. Thus, the electric circuit board 51 is arranged between the two shells 52.1, 52.2. As shown in FIG. 17 for example, the reinforcement element 52.1, 52.2 defines at least one window 52.4 in the connection area between the charge output 23.2 and the electrical connecting element 53. Through the window 52.4, the charge output 23.2 and the electrical connection element 53 are accessible from the outside and may be approached by means of a joining tool. Alternatively, the reinforcement element 52.1, 52.2 is made from one continuous piece without a window. Such an embodiment of the reinforcement element 52.1, 52.2 made from one piece without a window is pushed over the electric circuit board 51 in the longitudinal direction or is bent over the electric circuit board 51 in the radial direction by means of a flexure bearing.

During use of the piezoelectric pressure sensor 1, mechanical vibrations may be induced in the electric circuit board 51 due to engine vibrations. The electric circuit board 51 is a system capable of oscillating. The engine vibrations exhibit a broad band of frequencies. Resonance frequencies are those frequencies of the engine vibrations where an amplitude of the oscillating system is greater than that induced by adjacent frequencies of the engine vibrations. Resonance oscillations are oscillations of the electric circuit board 51 with resonance frequencies. However, in accordance with one aspect of the present invention, the reinforcement element 52.1, 52.2 mechanically reinforces the electric circuit board 51 against mechanical resonance vibrations in the radial plane AB and/or along the longitudinal axis CC'. Preferably, the reinforcing element 52.1, 52.2 fixes the electric circuit board 51 in its freedom of movement in the radial plane AB relative to the evaluation unit housing 50. To fix in this sense means to hold the electric circuit board 51 immobile relative to the evaluation unit housing 50. Preferably, the electric circuit board 51, which is arranged between the shells 52.1, 52.2 and is mechanically connected to the shells, 52.1, 52.2, forms a rigid body against mechanical resonance vibrations in the radial plane AB and/or along the longitudinal axis CC'. The reinforcement element 52.1, 52.2 makes a linear or surface mechanical contact with the electric circuit board 51. Engine vibrations occurring during use of the piezoelectric pressure sensor 1 are only able to induce dampened mechanical resonance vibrations in the radial plane AB or along the longitudinal axis CC' in the electric circuit board 51 that is reinforced in this manner, whereby the mechanical stress of the components involved in signal transmission of the piezoelectric pressure sensor 1 in the area of the electric circuit board 51 is permanently reduced.

An additional reinforcement of the electric circuit board 51 against bending loads along the longitudinal direction and/or along the radial direction desirably is achieved by an interference fit from the evaluation unit housing 50 to the reinforcement element 52.1, 52.2. In this case, the evaluation unit housing 50 presses the reinforcement element 52.1, 52.2 onto the electric circuit board 51 in certain areas. In addition, the charge output 23.2 and the electrical connection element 53 are positioned in the window 52.4 in a mechanically rigid manner by the interference fit. The evaluation unit housing 50 is slidable along the longitudinal axis CC' to be moved over the reinforcement element 52.1, 52.2. The reinforcement element 52.1, 52.2 desirably includes several individual sections 52.6, 52.6', 52.6" that are successively spaced end-to-end along the longitudinal axis CC'. In the embodiment according to FIGS. 12 and 13 for example, the reinforcement element 52.1, 52.2 includes three such individual sections 52.6, 52.6', 52.6". Preferably, each section 52.6, 52.6', 52.6" has a length of 30 mm, preferably a length of 60 mm, preferably a length of 90 mm measured along the longitudinal axis CC'. The evaluation unit housing 50 is slidable along the longitudinal axis CC' from a rear section 52.6" to a central section 52.6' and from the central section 52.6' to a front section 52.6 over the reinforcement element 52.1, 52.2. Preferably, the reinforcement element 52.1, 52.2 has different outer diameters in the rear section 52.6", in the central section 52.6' and in the front section 52.6. Preferably, each of the sections 52.6, 52.6', 52.6" extends over 33% of the length of the electric circuit board 51. Thus, in the longitudinal direction, the outer diameter of the reinforcement element 52.1, 52.2 is stepped successively from section to section. An outer diameter of the rear section 52.6" of the reinforcement element 52.1, 52.2 is smaller than/equal to the inner diameter of the evaluation unit housing 50. The evaluation unit housing 50 is manually slidable smoothly over the reinforcement element 52.1, 52.2. An outer diameter of the central section 52.6' of the reinforcement element 52.1, 52.2 is slightly oversized as compared to the inner diameter of the evaluation unit housing 50. If such an oversize exists, the evaluation unit housing 50 is manually slidable smoothly over the reinforcement element 52.1, 52.2. An outer diameter of the front section 52.6 of the reinforcement element 52.1, 52.2 has a larger oversize as compared to the inner diameter of the evaluation unit housing 50. In the case of a larger oversize, the evaluation unit housing 50 is no longer manually slidable over the reinforcement element 52.1, 52.2. The oversizes are chosen depending on the material so that the mechanical stresses that permit the interference fit are not exceeded. Knowing the present invention, the skilled artisan is also able to implement the reinforcement element without a central section and thus having only a front section and a rear section. Furthermore, the skilled artisan can implement a reinforcement element without a stepped outer diameter in which the outer diameter generally increases steadily from the rear to the front region.

As shown in FIGS. 12 and 13 for example, the reinforcement element 52.1, 52.2 electrically insulates the electric circuit board 51 from the evaluation unit housing 50 (FIGS. 1 and 2 for example). As shown in FIG. 14 for example, the reinforcement element 52.1, 52.2 includes at least one bending zone 52.5 to compensate for differences in the thermal coefficient of linear expansion between the electric circuit board 51, the reinforcement element 52.1, 52.2 and/or the evaluation unit housing 50. The bending zone 52.5 is formed as a groove that extends inwardly in the radial direction and axially in the longitudinal direction. In the area of the bending zone 52.5, the reinforcement element 52.1, 52.2 may expand or contract elastically and in this manner reduce thermally induced mechanical stresses to uncritical values, and in particular a plastic deformation of the reinforcement element 52.1 52.2 that is detrimental for its function may be avoided. Knowing the present invention, the skilled artisan also can implement the bending zone 52.5 in the form of at least one recess in the material of the reinforcement element 52.1, 52.2 or as a flexure hinge, etc. The reinforcement element 52.1, 52.2 dampens the spreading of engine vibrations from the sensor flange 20.2 and the evaluation unit housing 50 to the electric circuit board 51 so that the engine vibrations that reach the electric circuit board 51 are dampened in their strength, thus permanently reducing the mechanical stress of the components involved in signal transmission of the piezoelectric pressure sensor 1 in the region of the electric circuit board 51.

As shown schematically in FIG. 17 for example, a rear area of the sensor flange 20.2 is mechanically connected to a front edge of the evaluation unit housing 50 around its entire perimeter. This mechanical connection desirably is carried out by material bonding such as welding, diffusion welding, thermo compression bonding, soldering, etc. As shown in FIGS. 12 and 13 for example, a rear area of the sensor flange 20.2 includes a sensor housing frame 20.3. Preferably, the sensor flange 20.2 and the sensor housing frame 20.3 are integrally formed, and as shown in FIGS. 12 and 13 for example, the sensor housing frame 20.3 desirably includes at least one strut 20.4 that is oriented parallel to the longitudinal axis CC'.

As shown in FIGS. 10 and 11 for example, the sensor housing frame 20.3 desirably includes two struts 20.4, and the front end of the electric circuit board 51 is mechanically connected to the two struts 20.4, so that if one of these connections should fail due to vibration, then the other connection remains fully functional, thereby providing redundancy. Moreover, each of these mechanical connections desirably is made by form closure wherein each strut 20.4 defines an internal thread that receives a screw 20.5 attaching the electric circuit board 51 with the strut 20.4. This mechanical connection also is an electrical connection, and the screw 20.5 is mechanically connected to the electric circuit board 51 through at least one washer 20.6 that forms an electrical contact between the strut 20.4, the screw 20.5 and at least one electrical signal conductor of the electric circuit board 51. Accordingly, the washer 20.6 and the screw 20.5 are made of electrically conductive material such as pure metals, nickel alloys, cobalt alloys, iron alloys, etc. The electrical connection via the two struts 20.4 is also thereby redundant so that if one of the electrical connections via one of the two struts 20.4 should fail, then the other electrical connection via the other one of the two struts 20.4 remains fully functional. Signals from the return line that are received from the sensor flange 20.2 are transmitted via the sensor housing frame 20.3 to an electrical signal conductor of the electric circuit board 51. The signal transmission of the signals from the return line between the sensor flange 20.2 and the evaluation unit 5 desirably occurs only by means of material bonding and force closure. The force closure between the struts 20.4 and the electric circuit board 51 by means of screws 20.5 and washers 20.6 dampens mechanical resonance vibrations originating from engine vibrations along the longitudinal axis CC'.

Accordingly, a front area of the signal cable flange 54 desirably includes at least one strut 20.4. Preferably, the front area of the signal cable flange 54 includes two struts 20.4. A rear end of the electric circuit board 51 desirably is mechanically connected to each of the struts 20.4 of the signal cable flange 54. Also in this case, the mechanical connection is preferably carried out by force closure wherein a screw 20.5 is used to connect the electric circuit board 51 to the strut 20.4 via a threaded hole defined in the strut 20.4.

FIGS. 12, 13, 15 and 16 schematically show steps of the process of manufacturing the piezoelectric pressure sensor 1. The sensor assembly 2 according to FIG. 3 and the evaluation unit 5 desirably are manufactured as separate semi-finished products. This has the advantage that variations of the sensor assembly 2 may be produced and combined interchangeably with variations of the evaluation unit 5 to form different versions of a piezoelectric pressure sensor 1, the production of which being cost-effective. Variations of the sensor assembly 2 include membranes 21 with different membrane thicknesses and/or piezoelectric sensors 22 with different operating temperature ranges. Variations of the evaluation unit 5 include electric circuit boards 51 with different operating temperature ranges, and/or different signal types such as electrically unamplified electrical polarization charges, electrically amplified electric polarization charges, electric voltages, etc.

The sensor assembly 2 includes the membrane 21 accommodated in the sensor housing assembly 20, the piezoelectric sensor 22, the electrode arrangement 23, and the electric insulation body 25. The evaluation unit 5 includes the evaluation unit housing 50, the electric circuit board 51, the reinforcement element 52.1, 52.2, the electrical connection element 53, the signal cable flange 54 and the signal cable 55. The signal cable 55 is connected to the evaluation unit 5 via the signal cable flange 54. Aware of the present invention, those skilled in the art also can connect the signal cable to the evaluation unit with an electrical plug connector such as a signal cable plug etc., instead of a signal cable flange.

In one of the initial steps of the process of manufacturing the piezoelectric pressure sensor 1, the charge output 23.2 and the electrical connection element 53 are joined to each other. For this purpose, the rear end of the charge output 23.2 is pushed into the electrical connecting element 43 on the longitudinal axis CC' so that the rear end of the charge output 23.2 protrudes into the electrical connecting element 43 and the outer surface of the charge output 23.2 relative to longitudinal axis CC' and the inner surface of the electrical connecting element 43 relative to longitudinal axis CC' are in mechanical contact to each other in certain areas.

In another step of the process of manufacturing the piezoelectric pressure sensor 1, the front end of the electric circuit board 51 is mechanically connected to the sensor housing frame 20.3 by force closure wherein screws threaded into the internal threads defined in the struts of the sensor housing frame 20.3 mechanically and electrically connect the electric circuit board 51 to the sensor housing frame 20.3.

In a subsequent process step of manufacturing the piezoelectric pressure sensor 1, the reinforcement element 52.1, 52.2 is mechanically connected by form closure or force closure to the electric circuit board 51 or they are interconnected. This form closure or force closure is represented schematically in FIGS. 12 and 13. Preferably, several locking elements 52.3, 52.3' of one reinforcement element 52.1, 52.2 are engaged in corresponding openings of the other reinforcement element 52.1, 52.2 and reinforce the electric circuit board 51 mechanically against bending loads along the longitudinal axis CC' and/or along the horizontal axis BB'.

Referring to FIG. 15, in a further step of the process of manufacturing the piezoelectric pressure sensor 1, the evaluation unit housing 50 is moved along the longitudinal axis CC' toward the sensor flange 20.2. In effecting this relative movement, the reinforcement element 52.1, 52.2 is at the same time pressed in an interference fit onto the electric circuit board 51 by the evaluation unit housing 50. This interference fit between the reinforcement element 52.1, 52.2 and the electric circuit board 51 mechanically reinforces the electric circuit board 51 additionally against bending loads along the longitudinal axis CC' and/or along the horizontal axis BB'.

Subsequently, in another step of the process of manufacturing the piezoelectric pressure sensor 1, the outer surface of the charge output 23.2 and the inner surface of the electrical connection element 53 are electrically and mechanically connected to each other in certain areas. The electrical and mechanical connection desirably is achieved by material bonding such as welding, diffusion welding, thermo compression bonding, soldering, etc. A joining tool inserted through the window 52.4 of the reinforcement element 52.1, 52.2 desirably carries out this material bonding between the charge output 23.2 and the electrical connection element 53. The joining tool is not schematically depicted in FIG. 15. Nonetheless, the joining tool desirably can include electrodes of an electrical resistance welding system. Such joining tool desirably also can be a crimping tool, a laser, etc. Thus, to enable the joining tool to perform the material bonding through the window 52.4 of the reinforcement element 52.1 52.2, during this step the evaluation unit housing 50 is spaced apart from the sensor flange 20.2 on longitudinal axis CC'.

In yet another step of the process of manufacturing the piezoelectric pressure sensor 1, the evaluation unit housing 50 is displaced completely relative to the sensor flange 20.2 along the longitudinal axis CC' so that, as shown in FIG. 16 for example, the front edge of the evaluation unit housing 50 is in mechanical contact with the rear edge of the sensor flange 20.2 and is accessible from the outside. This displacing of the evaluation unit housing 50 is schematically shown in FIG. 16 by an arrow. In this way, the rear area of the sensor flange 20.2 is generally flush with the front edge of the evaluation unit housing 50 and is accessible from the outside while the reinforcement element 52.1, 52.2 is now concealed.

In a following step of the process of manufacturing the piezoelectric pressure sensor 1, the evaluation unit housing 50 is connected to the sensor flange 20.2 in certain areas. Preferably, the front edge of the evaluation unit housing 50 is mechanically connected to the rear edge of the sensor flange 20.2 around its entire perimeter. The mechanical connection desirably is carried out by material bonding such as welding, diffusion welding, thermo compression bonding, soldering, etc. A joining tool desirably produces the material bond between the front edge of the evaluation unit housing 50 and the rear edge of the sensor flange 20.2. However, such joining tool is not schematically depicted in FIG. 16.

In yet another step of the process of manufacturing the piezoelectric pressure sensor 1, the evaluation unit housing 50 is mechanically connected to the signal cable flange 54 in certain areas. Preferably, the rear area of the evaluation unit housing 50 is mechanically connected to a front edge of the signal cable flange 54 around its entire perimeter. This mechanical connection desirably is carried out by material bonding such as welding, diffusion welding, thermo compression bonding, soldering, etc. A joining tool (not shown) desirably produces this material bond between the rear area of the evaluation unit housing 50 and the front edge of the signal cable flange 54.

Knowing the present invention, those skilled in the art can implement a piezoelectric pressure sensor 1 in which all components of the piezoelectric pressure sensor 1 that are directly involved in signal transmission are connected to each other through material bonding. Furthermore, a piezoelectric pressure sensor 1 can be implemented in which all mechanical connections between its constituent parts are material bonds.

LIST OF REFERENCE NUMERALS

A, B, C enlarged area
AA', BB', CC' axis

AB radial plane
1 pressure sensor
2 sensor assembly
5 evaluation unit
20 sensor housing assembly
20.1 sealing cone
20.2 sensor flange
20.3 sensor housing frame
20.4 struts
20.5 screws
20.6 washers
21 membrane
22 sensor
22.1, 22.3 support element
22.2 piezoelectric sensor element
23 electrode arrangement
23.1 charge pick-off
23.2 charge output
25 electric insulation body
26 compensation element
50 evaluation unit housing
51 electric circuit board
51.1 high temperature region
51.2 normal temperature region
52.1, 52.2 reinforcement element
52.3, 52.3' locking element
52.4 window
52.5 bending zone
52.6, 52.6', 52.6" area
53 electrical connection element
53.0 adapter in the form of a socket
53.1 annular adapter
53.2 compensation element
54 signal cable flange
55 signal cable

What is claimed is:

1. A pressure sensor comprising:
a sensor assembly that includes a sensor that is electrically connected to an electrode arrangement; and
an evaluation unit that includes an electric circuit board that is electrically connected to the electrode arrangement only by welding, diffusion welding, thermo compression bonding or soldering; and
wherein the sensor is configured to generate signals under the action of a pressure profile, and the electrode arrangement is configured to transmit the signals to the evaluation unit.

2. The pressure sensor according to claim 1, further comprising a plurality of successive connections, wherein each of the successive connections enabling the transmission of a signal from the electrode arrangement to the evaluation unit consists only of material bonding.

3. The pressure sensor according to claim 1, wherein each of a plurality of successive connections is configured and disposed to enable the transmission of a signal from the sensor to the evaluation unit via the electrode arrangement, and each of these successive connections consists only of material bonding.

4. The pressure sensor according to claim 1, wherein:
the pressure sensor is a piezoelectric pressure sensor;
the sensor is a piezoelectric sensor;
the piezoelectric sensor produces piezoelectric charges under the action of a pressure profile; and
the electrode arrangement receives the piezoelectric charges from the piezoelectric sensor and transmits the received piezoelectric charges as signals to the evaluation unit.

5. The pressure sensor according to claim 1, wherein:
the electrode arrangement includes a charge output; and
the electric circuit board includes an electrical connection element that is connected by a material bond to the charge output.

6. The pressure sensor according to claim 5, wherein:
the charge output is shaped as a rod; and
the electrode arrangement includes a cylindrically shaped charge pick-off that is formed integrally with the charge output.

7. The pressure sensor according to claim 5, wherein the charge output extends to an end of the sensor assembly that faces away from the piezoelectric sensor.

8. The pressure sensor according to claim 1, wherein:
the electric circuit board includes an electrical signal conductor, a high temperature region, and an electrical connection element arranged in the high temperature region;
the electrode arrangement is joined directly to the electrical connection element; and
the electrical connection element includes an adapter in the form of a socket that is connected in the high temperature region of the electric circuit board by material bonding to the electrical signal conductor of the electric circuit board.

9. The pressure sensor according to claim 1, wherein:
the electric circuit board includes a high temperature region and an electrical connection element arranged in the high temperature region;
the electrode arrangement is joined directly to the electrical connection element; and
the electrical connection element includes an annular adapter and a compensation element that is integrally formed with the annular adapter.

10. The pressure sensor according to claim 1, wherein:
the electric circuit board includes a high temperature region and an electrical connection element arranged in the high temperature region and defining a front end thereof;
the electrode arrangement is joined directly to the electrical connection element; and
the electrical connection element includes an annular adapter that is arranged at the front end of the electrical connection element.

11. The pressure sensor according to claim 9, wherein:
the compensation element includes at least one bend that is configured for compensating for at least one of:
differences in the thermal coefficients of linear expansion of signal-transmitting components of the pressure sensor and
manufacturing tolerances along a longitudinal axis of components of the sensor assembly and the evaluation unit.

12. The pressure sensor according to claim 9, wherein:
the compensation element generally extends over the entire high temperature region of the electric circuit board and at least one opening is defined through the high temperature region of the electric circuit board;
the compensation element includes at least one leg that is inserted into the at least one opening in the high temperature region of the electric circuit board to mechanically attach the high temperature region of the electric circuit board to the compensation element; and
the at least one leg being configured to be elastically or plastically deformable upon being inserted in the at least one opening in the high temperature region of the electric circuit board.

13. The pressure sensor according to claim 9, wherein:
the electric circuit board includes a normal temperature region and an electrical signal conductor in the normal temperature region; and
the compensation element is connected by material bonding to the electrical signal conductor of the electric circuit board in the normal temperature region of the electric circuit board.

14. The pressure sensor according to claim 1, wherein:
the electric circuit board includes electronic components, a high temperature region and a normal temperature region; and
the electronic components of the electric circuit board are mounted only in the normal temperature region.

15. The pressure sensor according to claim 1, wherein:
the evaluation unit includes a reinforcement element that surrounds the electric circuit board and is connected to the electric circuit board in a mechanically detachable manner by at least one of form closure and force closure.

16. The pressure sensor according to claim 1, wherein:
the evaluation unit includes a reinforcement element that surrounds the electric circuit board and includes at least two shells; and
at least one of the shells is connected to the electric circuit board in a mechanically detachable manner by at least one of form closure and force closure.

17. The pressure sensor according to claim 1, wherein the material bonding is diffusion welding.

18. The pressure sensor according to claim 1, wherein the electric circuit board is soldered to the electrode arrangement.

19. The pressure sensor according to claim 1, further comprising:

a joint that electrically connects the electrode arrangement to the electric circuit board element by welding, diffusion welding, thermo compression bonding or soldering and that is configured for electrically transmitting the signals generated by the sensor to the electric circuit board; and
a reinforcement element that encloses the electric circuit board and that defines a window configured to permit access to the joint by a tool configured for forming the joint by welding, diffusion welding, thermo compression bonding or soldering.

20. A pressure sensor that measures a pressure profile, the pressure sensor comprising:
a sensor assembly that includes a sensor that is configured to generate signals under the action of the pressure profile;
an electrode arrangement that is electrically connected to the sensor and that includes a charge output;
an evaluation unit that includes an electric circuit board, which includes an electrical connection element;
a joint that connects the charge output to the electrical connection element only by welding, diffusion welding, thermo compression bonding or soldering and configured for electrically transmitting the signals generated by the sensor to the electric circuit board; and
a reinforcement element that encloses the electric circuit board and that defines a window configured to permit access to the electrical connection element of the electric circuit board by a tool configured for forming the joint by welding, diffusion welding, thermo compression bonding or soldering.

* * * * *